United States Patent [19]
Moser et al.

[11] Patent Number: 5,944,137
[45] Date of Patent: Aug. 31, 1999

[54] VEHICLE STEERING SYSTEM

[75] Inventors: Martin Moser, Fellbach; Reinhold Schneckenburger, Rutesheim, both of Germany

[73] Assignee: Daimler-Benz AG, Germany

[21] Appl. No.: 08/919,236

[22] Filed: Aug. 28, 1997

[30] Foreign Application Priority Data

Aug. 28, 1996 [DE] Germany .......................... 196 34 728

[51] Int. Cl.⁶ ..................................................... B62D 5/04
[52] U.S. Cl. ........................ 180/446; 180/421; 180/422; 180/444
[58] Field of Search ................... 180/446, 444, 180/422, 421; 701/41

[56] References Cited

U.S. PATENT DOCUMENTS

| | | | |
|---|---|---|---|
| 5,307,892 | 5/1994 | Phillips | 180/422 |
| 5,448,482 | 9/1995 | Yamamoto et al. | 180/446 |
| 5,475,289 | 12/1995 | McLaughlin et al. | 180/446 |
| 5,521,820 | 5/1996 | Wakamatsu et al. | 180/446 |
| 5,528,497 | 6/1996 | Yamamoto et al. | 180/446 |
| 5,541,841 | 7/1996 | Tanaka | 180/446 |
| 5,606,502 | 2/1997 | Adachi et al. | 180/446 |
| 5,615,117 | 3/1997 | Serizawa | 180/446 |
| 5,703,775 | 12/1997 | Yamamoto et al. | 180/446 |
| 5,742,918 | 4/1998 | Ashrafi et al. | 180/446 |
| 5,743,351 | 4/1998 | McLaughlin | 180/446 |
| 5,764,015 | 6/1998 | Shimizu et al. | 180/446 |
| 5,774,819 | 6/1998 | Yamamoto et al. | 180/446 |

FOREIGN PATENT DOCUMENTS

| | | |
|---|---|---|
| 0 081 398 | 10/1982 | European Pat. Off. . |
| 0 596 167 A1 | 11/1992 | European Pat. Off. . |
| 41 34 390 A1 | 4/1992 | Germany . |
| 42 32 256 C2 | 4/1993 | Germany . |
| 43 00 366 A1 | 7/1993 | Germany . |
| 195 47 176 A1 | 7/1996 | Germany . |
| 2 308 106 | 12/1996 | United Kingdom . |

*Primary Examiner*—Lanna Mai
*Assistant Examiner*—Michael Cuff
*Attorney, Agent, or Firm*—Evenson, McKeown, Edwards & Lenahan, P.L.L.C.

[57] ABSTRACT

A vehicle steering system has an electronic control system for coupling a steering device and the steered wheels of the vehicle, with the steering angle setpoint signal passing though a filter before a setpoint/actual value comparison is made. The filter passes essentially only those frequencies below an adjustable transition frequency. A switch is made to a low transition frequency when there is to be a direct translation between the steering device and the steered wheels of the vehicle.

5 Claims, 2 Drawing Sheets

VEHICLE STEERING SYSTEM

BACKGROUND AND SUMMARY OF THE INVENTION

This application claims the priority of German Application No. 19634728.9-21, filed Aug. 28, 1996, the disclosure of which is expressly incorporated by reference herein.

The invention relates to a vehicle steering system with an electronic control system for coupling the steering wheel and steered wheels of the vehicle, in which a signal evaluation circuit receives input signals from a transducer operated by the steering wheel, and converts them with a predetermined progressivity between the change in signal on the input side on output side, to produce a steering angle setpoint signal. The system comprises a filter (or operates as such), which essentially passes only those frequencies below a transition frequency that can be varied as a function of parameters.

Currently, in conventional highway vehicles, the steering device and/or a steering wheel and the steered wheels of the vehicle are mechanically forcibly coupled together, with a servo assembly being provided as a rule to reduce the manual force required.

However, vehicle steering systems have been designed in which the steering wheel and the steered wheels of the vehicle are coupled with one another only by an electronic control system which compares a steering angle setpoint determined by the steering wheel with the corresponding actual value at the steered vehicle wheels, and adjusts the vehicle wheels accordingly. Such designs resemble electronic control systems like those known in aircraft. These systems, called "fly by wire" in aircraft, have in the meantime become so reliable that they are routinely used in passenger aircraft as well.

In steering systems with electronic control circuits for coupling the steering wheel and the steered wheels of the vehicle, it is possible to change the translation ratio between the adjusting travel of the steering wheel and the change in the steering angle of the steered wheels of the vehicle as a function of a selected group of parameters, in an especially simple manner. Such a system is disclosed, for example, in German patent document, DE 41 34 390 A1. However, a comparatively high construction cost is involved for this purpose, which in the case of the control circuit provided for coupling between the steering wheel and the steered vehicle wheels, can be replaced by appropriate computer operations for which electronics can be easily programmed with an appropriate design. As a result, therefore, it is possible at low cost in an advantageous manner, at a very low road speed, (such as that which is typical of parking maneuvers), to operate with a high translation ratio so that a small movement of the steering wheel is sufficient to change the steering angle of the steered vehicle wheels considerably.

Another advantage of steering systems with electronic control circuits for coupling the steering wheel and the steered vehicle wheels is that it is comparatively easy to perform an automatic steering correction when unanticipated disturbing forces (such as a side wind) act on the vehicle. In this connection, reference is made to DE 42 32 256 C2.

A vehicle steering system of the type mentioned above is known from German patent document DE 43 00 366 A1 and takes the form of an additional steering system for the rear wheels, with the setpoint signal generated by the regulator passing through a low pass filter.

German patent document DE 195 47 176 A1 teaches a method for determining a regulating parameter adapted to actual driving conditions in a circuit for regulating the driving stability of a vehicle, with a circuit stage that serves to generate a setpoint signal connected on the input side with lowpass filters.

The goal of the present invention is to produce a high degree of insensitivity to disturbing influences on the steering wheel in a steering system of the type recited at the outset.

This goal is achieved according to the invention by utilizing a filter that operates with a low transition frequency (that is, a low pass filter having an upper limit of the pass band which is set at a low frequency) when a direct translation exists between an adjusting movement of the steering wheel and the resulting change in the steering angle of the steered wheels of the vehicle, and operates at a high transition frequency (that is, the upper limit of the pass band is set at a higher frequency) when an indirect translation exists for the steering system between the adjusting movement of the steering wheel and the resulting change in the steering angle of the steered wheels of the vehicle.

The invention is based on the general idea that when there is an abrupt change in the input signal generated by the steering wheel and the transducer which it actuates, the output signal changes only with a presettable progressivity, but not as abruptly, in order to change the input signal to a similar degree abruptly. This can be accomplished in simple fashion by using the above mentioned filter. An abrupt change in the signal can be represented (mathematically) with theoretically any degree of accuracy as the superimposition of a great many different frequency components; in other words, an infinitely large number that can be counted with mathematical exactness as superimposition. When the filter cuts out the higher-frequency signal components above the presettable transition frequency, only signal components with relatively low frequencies will be taken into account in the superimposition. As a result, instead of an abrupt signal change, a more or less steep increase or decrease in the signal is generated.

Thus, the adjustment rate of the steered wheels of the vehicle is less than the adjustment speed of the steering wheel, so that very rapid oscillating movements of the steering device cause only comparatively minor oscillating movements of the steered wheels of the vehicle.

According to one especially preferred embodiment of the invention, the filter is set to a low transition frequency when, for example at a low driving speed, because of the correspondingly high translation ratio, a minor adjustment of the steering handle produces large changes in the steering angle of the steered wheels of the vehicle. On the other hand, for example at higher speeds, when there is a low translation ratio between the steering wheel and the steered wheels of the vehicle, the filter is set to a high transition frequency. In the latter case, movements of the steering wheel are transmitted directly and without any significant delay to the steered wheels of the vehicle, while in the former case, a delayed transmission takes place, similar to that in mechanical forced coupling with considerable elasticity.

Other objects, advantages and novel features of the present invention will become apparent from the following detailed description of the invention when considered in conjunction with the accompanying drawings.

DETAILED DESCRIPTION OF THE DRAWINGS

Figure 1:
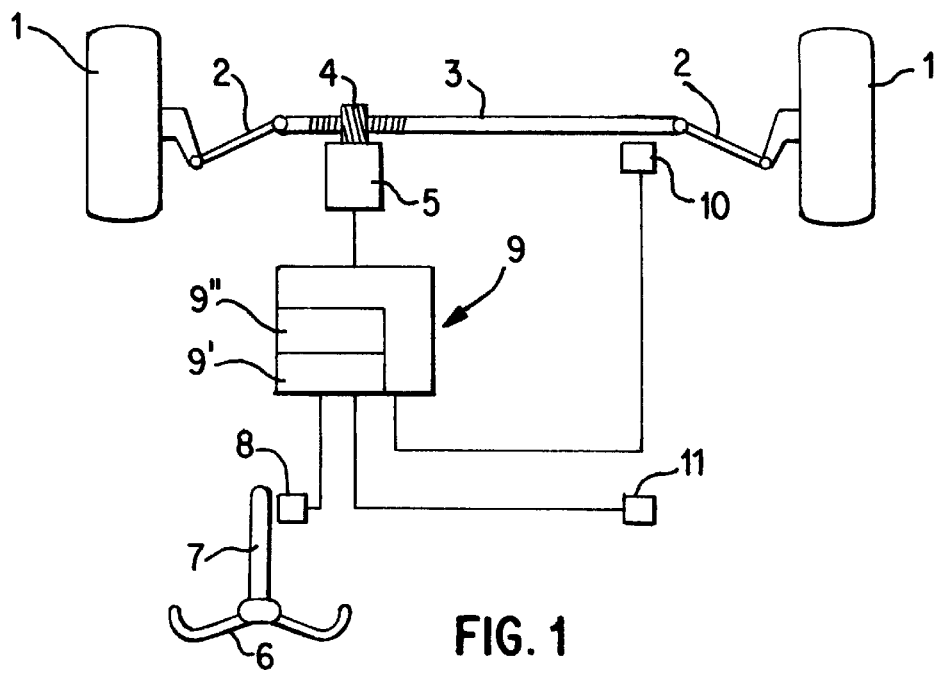
FIG. 1 shows a vehicle steering system with a signal evaluation circuit according to the invention.

According to FIG. 1, a motor vehicle (not shown in detail) has two steered front wheels 1 that are coupled for steering actuation by tie rods 2 with a rack 3 that is displaceable transversely with respect to the vehicle. When rack 3 is displaced in one direction or the other parallel to the axis of the rack, the steered wheels 1 of the vehicle are steered to the right or left. Rack 3 meshes with a pinion 4 that is driven by a positioning motor 5 which is basically of any type; in the case shown, positioning motor 5 is in the form of an electric motor.

For the vehicle steering to be operated by the driver, a so-called yoke 6 or other steering handle, for example a steering wheel (not shown), is provided. Yoke 6 is nonrotatably connected with a very short shaft 7, which actuates a transducer 8 as yoke 6 is rotated around the axis of the shaft. The transducer in turn generates a signal that reproduces the rotational angle of yoke 6. Transducer 8 is connected to one input of an electronic regulating circuit 9 which is also connected to receive an input signal from a transducer 10 indicative of the actual value of the steering angle as well as additional transducers for other parameters, for example a transducer 11 for the road speed of the vehicle. The output of the regulating circuit is connected with electric positioning motor 5.

Provision is made in the steering system according to the invention for varying the translation ratio between the change in the rotational angle of yoke 6 and the change in the steering angle of the steered wheels of the vehicle 1 as a function of selected parameters. For example, the system may be designed so that in a middle range in the vicinity of the straight-ahead position of steered wheels 1, yoke 6 must undergo a relatively large changes in the rotational angle to produce relatively small changes in the steering angle of steered wheels 1 of the vehicle. On the other hand, in the range of larger steering angles of steered wheels 1 of the vehicle, the steering system can operate comparatively directly so that small changes in the rotational angle of yoke 6 produce large changes in the steering angle at the steered wheels of the vehicle. In addition, as noted previously the translation ratios can also change as a function of the road speed, in other words as a function of the signals from transducer 11.

The respective parameter-dependent specific setpoint of the steering angle is determined from a setpoint calculator 9' that is part of regulating circuit 9, for example from the signals from transducers 8 and 11 in the example shown.

According to a special feature of the invention, the regulating circuit 9 comprises a filter system 9" which passes only those frequency components which are below a parameter-dependent variable transition frequency (i.e., a low pass filter). This filter system 9" filters the output signals from setpoint calculator 9', and only the output of filter system 9" is processed as a comparison between the setpoint and actual value. In other words the difference between the output signal from transducer 10 and the output of filter system 9" is determined in order to control adjusting motor 5 as a function of the difference between the setpoint and the actual value.

Figure 3:
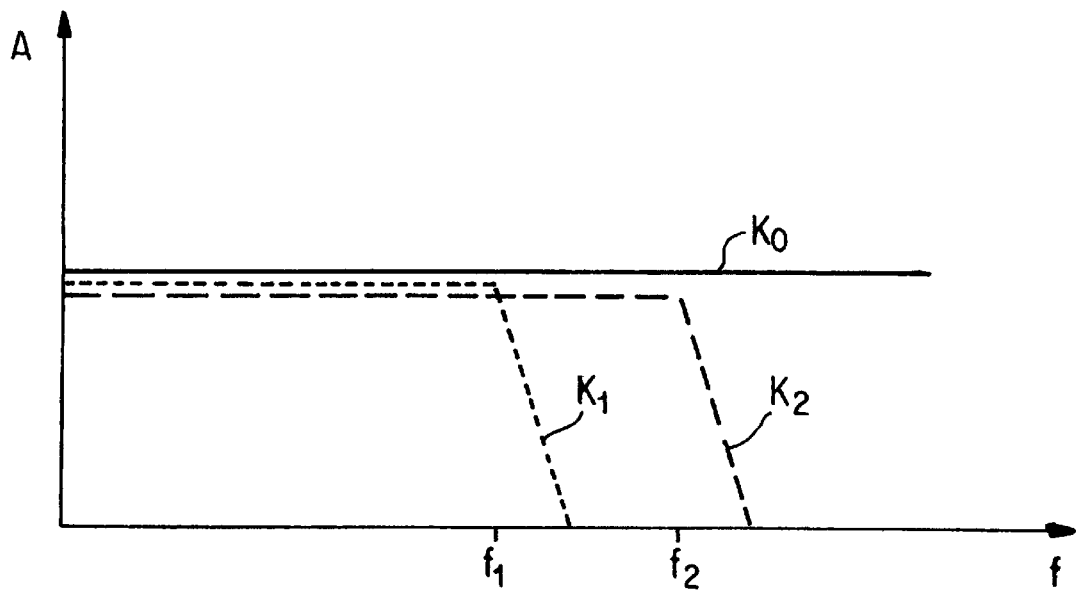
FIG. 3 is a graph that depicts the transmission behavior of the filter.

FIG. 3 shows the transmission behavior of filter system 9". Curve $K_0$ represents the amplitude A of a signal applied to the input of filter system 9" as a function of frequency f, while curve $K_1$ represents the amplitude A of the corresponding output signal as a function of frequency f for a transition frequency of $f_1$ of the filter. Curve $K_2$ then shows the ratios for the output signal at a transition frequency $f_2$.

While the input signal has the same amplitude for all frequencies, the output signal has a constant amplitude only for frequencies below the transition frequency; above the transition frequency, the amplitude has a practical value of 0; in other words in this range the filter system does not pass anything. In the vicinity of the respective transition frequency, the amplitude of the output signal drops off sharply as the frequency increases.

Figure 4:
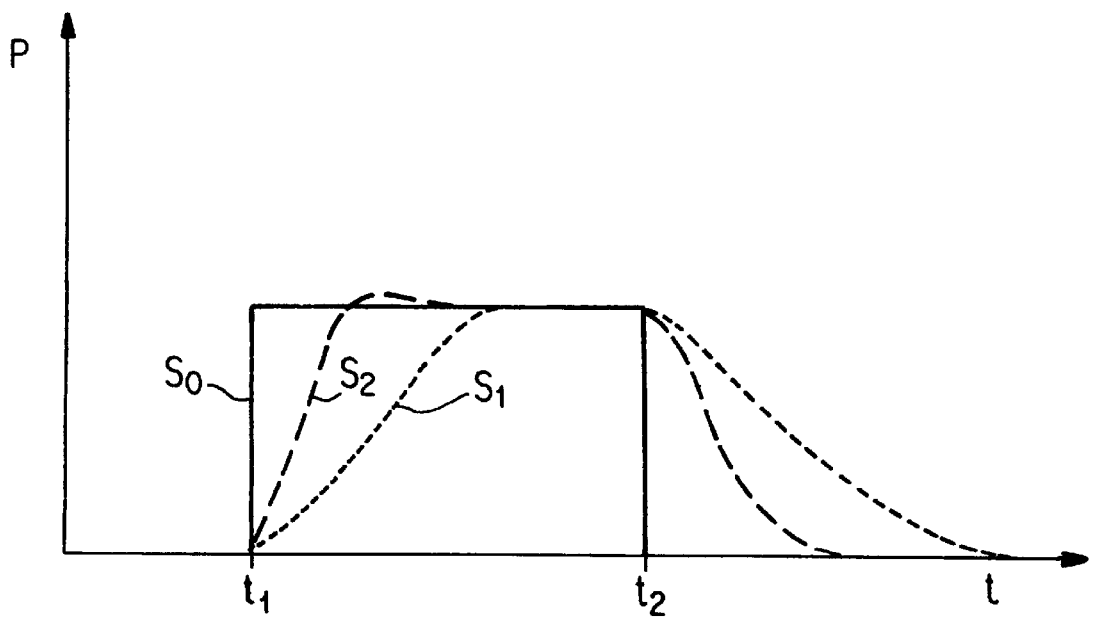
FIG. 4 is a graph that shows the output signal generated by the signal evaluation circuit following an abrupt change in the input signal for two different transition frequencies of the filter.

FIG. 4 shows the effect of filter system 9" in the steering control system of FIG. 1. Curve $S_0$ is a sample pattern for the level P of the setpoint determined by setpoint calculator 9' as a function of time t. In the example shown, the setpoint is increased abruptly at a point in time $t_1$ and drops off correspondingly abruptly at a point in time $t_2$. Curves $S_1$ and $S_2$ then show the resultant signal at the output of filter system 9", with the transition frequency having the value $f_1$ in one case and the value $f_2$ in the other.

It can be seen that at a comparatively high transition frequency $f_2$ the output signal rises relatively steeply, although not abruptly, when the input signal is increased abruptly, and when the input signal drops abruptly, the output signal drops off correspondingly steeply. If on the other hand filter system 9" has a low transition frequency, the rise and fall of the output signal are correspondingly flat; consequently, with an adjusting movement of yoke 6 the adjustment of steered wheels 1 of the vehicle takes place at a reduced speed, and yoke 6 therefore "leads" the steering adjustment of the steered wheels of the vehicle. Thus, rapid oscillating movements of yoke 6 can lead only to sharply reduced oscillating movements of steered wheels 1 of the vehicle. In effect, the steered wheels 1 of the vehicle "do not notice" the oscillating movements of yoke 6.

Filter system 9" is advantageously switched to a low transition frequency when the steering system is in an operating state in which a very direct translation between the rotary movements of the yoke and the steering movements of the steered wheels 1 of the vehicle is taking place, in other words when relatively small rotary movements of yoke 6 produce comparatively large changes in the steering angle of steered wheels 1 of the vehicle.

Figure 2:
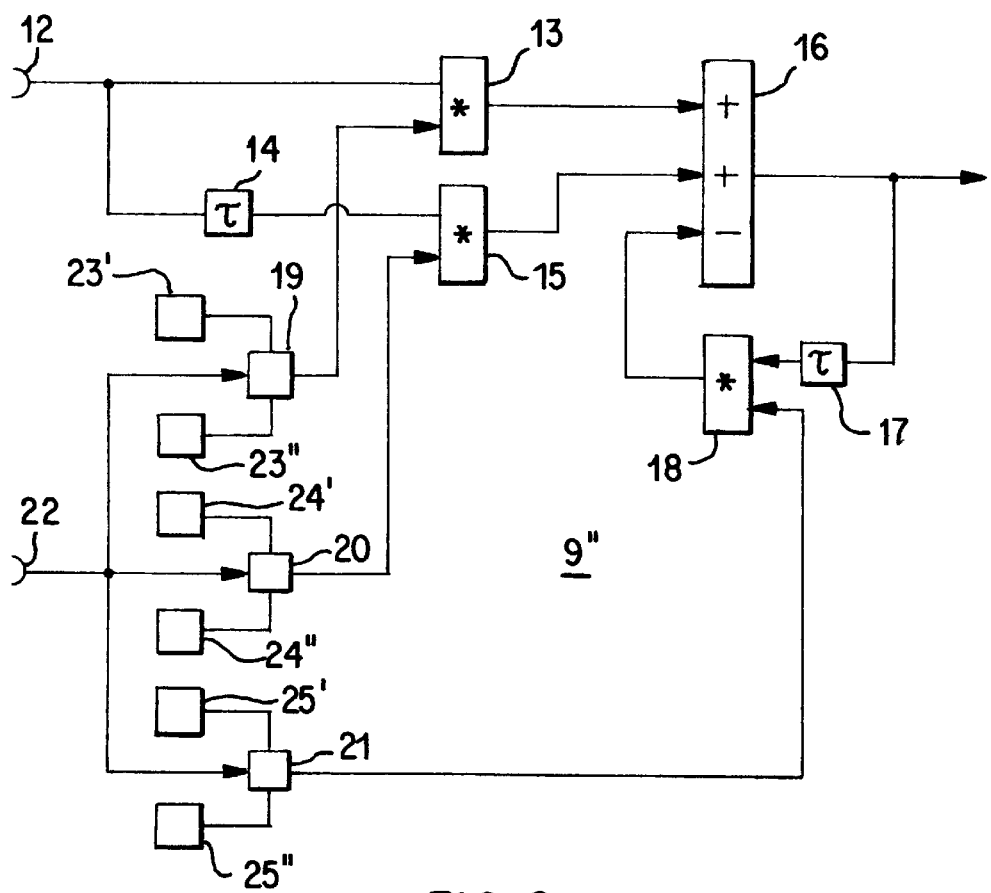
FIG. 2 is a sample design of the filter with variable transition frequencies.

Filter 9" can have the structure shown as an example in FIG. 2, forming a filter of the first order. The setpoint signal coming from setpoint calculator 9' is supplied to a signal input 12 connected directly with one input of a multiplier 13 and through a delay line 14 with one input of another multiplier 15. The respective outputs of multipliers 13 and 15 are each connected with an input of an adder 16, whose output on the one hand forms the output of filter 9" and on the other hand is connected through a delay line 17 with one input of multiplier 18 whose output is coupled with another input of adder 16.

The inputs of the multipliers 13, 15, and 18 are connected with the outputs of respective switching member 19, 20, or 21. Switching members 19 to 21 are actuated by a control input 22 so that they connect the associated inputs of each of multiplier members 13, 15, and 18 either with storage locations 23', 24', and 25' or with storage locations 23", 24", and 25". Storage locations 23', 24', and 25' contain fixed values that are associated with transition frequency $f_1$, while storage locations 23", 24", and 25" contain fixed values associated with transition frequency $f_2$. Depending on whether one or another fixed value is applied to the associated inputs of multiplier members 13, 15, and 18, filter 9" operates with transition frequency $f_1$ or transition frequency $f_2$.

When direct translation is provided (between the adjusting travel of steering device 6 and the change in the steering angle of steered wheels 1) for larger steering angles of steered wheels 1, and an indirect translation is provided for smaller steering angles of steered wheels 1, a control signal for the switching of switching members 19 to 21 can be derived from the steering angle actual values determined by transducer 10 and supplied to control input 22. When the value of the steering angle is above a threshold value, a control signal is generated that connects the switching members with storage locations 23', 24', and 25'. Below the threshold value, a signal is applied by which the switching members 19 to 21 are connected with storage locations 23", 24", and 25".

If the contents of storage locations 23' to 25" are calculated on line as a function of a continuous control signal, the limiting frequency can also be changed continuously.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. a vehicle steering system with electronic control circuit for coupling a steering input device and steered vehicle wheels by means of a signal evaluation circuit that generates output signals for controlling a steering motor which actuates said steered vehicle wheels, said system comprising:

a transducer actuated by the steering input devices; and an electronic control circuit connected to receive signals from said transducer as inputs, for generating said output signals by converting such input signals with a predeterminable progressivity between changes in the input signals and changes in said output signals, said electronic control circuit having a filter that passes only those frequencies of said input signals below a transition frequency; wherein the filter operates with a low transition frequency when a direct translation exists for steering between the adjusting travel of steering input device and the change in the steering angle of steered wheels of the vehicle; and with a high transition frequency when an indirect translation exists between the adjusting travel of steering input device and the change in the steering angle of steered wheels of the vehicle.

2. Vehicle steering system according to claim 1, wherein an indirect translation is performed at small steering angles of steered wheels of the vehicle and a direct translation is performed at large steering angles of the steered wheels of the vehicle, between the adjusting travel of steering handle and the change in the steering angle of the steered wheels of the vehicle.

3. A steering angle control system for a vehicle having a steering input device for determining a steering angle for steered wheels of said vehicle and a motor for controlling angular position of said steered wheels based on said steering angle, said control system comprising a transducer actuated by said steering input device;

a steering set point calculator unit which generates a steering setpoint signal in response to an output from said transducer; and a low pass filter coupled to receive said steering setpoint signal as an input, and to supply a filtered steering setpoint signal to said motor for actuating said steered wheels;

wherein said low pass filter has a variable pass band cutoff frequency, and operates with a low transition frequency when a direct translation exists for steering between the adjusting travel of steering input device and the change in the steering angle of steered wheels of the vehicle, and with a high transition frequency when an indirect translation exists between the adjusting travel of steering input device and the change in the steering angle of steered wheels of the vehicle.

4. The control system according to claim 3, further comprising:

a sensor for determining a steering angle of said steered wheels; and an electronic circuit which causes said low pass filter to switch to a first, relatively higher, cutoff frequency when said steering angle is large, and to a second, relatively lower, cutoff frequency when said steering angle is small.

5. The control system according to claim 3, further comprising:

a sensor for determining an operating speed of said vehicle; and an electronic circuit which causes said low pass filter to switch to a first, relatively higher, cutoff frequency when said vehicle speed is large, and to a second relatively lower cutoff frequency when said vehicle speed is small.

* * * * *